(12) United States Patent
Barker

(10) Patent No.: US 11,137,274 B1
(45) Date of Patent: Oct. 5, 2021

(54) GAUGE STAND

(71) Applicant: John Barker, Jacksonville, FL (US)

(72) Inventor: John Barker, Jacksonville, FL (US)

( * ) Notice: Subject to any disclaimer, the term of this patent is extended or adjusted under 35 U.S.C. 154(b) by 0 days.

(21) Appl. No.: 17/081,397

(22) Filed: Oct. 27, 2020

(51) Int. Cl.
  *G01D 11/30* (2006.01)

(52) U.S. Cl.
  CPC .................................... *G01D 11/30* (2013.01)

(58) Field of Classification Search
  CPC ...................................................... G01D 11/30
  USPC ......................................................... 73/866.5
  See application file for complete search history.

(56) References Cited

U.S. PATENT DOCUMENTS

| | | | |
|---|---|---|---|
| 7,431,313 B1 | 10/2008 | Torres | |
| 9,010,823 B1 * | 4/2015 | Murray | B25H 3/025 294/143 |
| 9,163,775 B2 | 10/2015 | Rohrbach | |
| 9,616,562 B2 | 4/2017 | Hoppe | |
| 9,944,217 B2 | 4/2018 | Schroeder | |
| 10,126,731 B2 | 11/2018 | Lindstrom | |
| 2014/0166516 A1 | 6/2014 | Martinez | |
| 2016/0282899 A1 | 2/2016 | Inagaki | |

FOREIGN PATENT DOCUMENTS

CN   209214653 U  *  8/2019

* cited by examiner

*Primary Examiner* — Jamel E Williams
(74) *Attorney, Agent, or Firm* — Lawrence J. Gibney, Jr.

(57) ABSTRACT

This gauge stand will adhere to a metallic surface in the field so that a technician can hang gauges from the short hollow pipe and work hands free on the equipment to be serviced while at the same time viewing the gauges that are normally used with this type of job. The gauge stand is designed to be portable and should be made to withstand extremes in temperature and all types of environments. A short hollow pipe will enable the technician to store commonly used small items in the short hollow pipe; an insert will be placed in one end of the short hollow pipe to ensure that the small items do not spill out when the device is taken apart.

4 Claims, 6 Drawing Sheets

GAUGE STAND

FIELD OF THE INVENTION

This device will allow a technician in the filed to carry testing equipment to a job site and mount this device temporarily so that the technician can complete the task while using the gauges in the field. It is designed to be portable lightweight while at the same time providing enough room to mount any testing equipment.

PRIOR ART

There are references in the prior art that relate to tool storage items. This device will store a few items in a device that will also enable a person to use gauges safely and without incident. A representative example of such a device can be found at Torres U.S. Pat. No. 7,431,313 which is a portable tool storage apparatus system. The Torres device, however, is not very portable and is structurally much different from the current device.

Another example is found at Murray U.S. Pat. No. 9,010,823, which is a socket organizer. It is obviously not used in the AC business but demonstrates some of the prior art regarding tool storage systems. Another reference is found at Rohrbach U.S. Pat. No. 9,163,775 that teaches a magnetic stand for an electronic device. The use of a magnet(s) for stands is not very novel and is simply a feature of this device.

There are other references in the prior art that describe tool storage systems but none that combine all the features to include the use of a magnetic base, a means to mount gauges and a space to store commonly used small items.

BRIEF SUMMARY OF THE INVENTION

This device will be used in the field by different technicians as the technician diagnoses and troubleshoots different scenarios related to mechanical problems in the field. It will be very handy for technicians who must carry gauges or other types of testing equipment. Often the technician carries testing items such as gauges to the worksite and must read the gauges in order to complete the tasks. This testing equipment is expensive and sometimes difficult to replace and it is in the interest of the technician to protect this equipment. The gauges are expensive and can be damaged if they are dropped in the field and this device will enable the technician to mount the gauges on the stand and view the gauges while diagnosing the problem.

The technician would have the ability to hang the gauges on a section of this device so that he or she can diagnose the problem while at the same time view the gauges. Often the technician is working in confined, cluttered spaces and must lay the gauges down on a surface that may be unstable or may shift. If the surface shifts, the gauge may become damaged and this would lead to additional expense. If the technician leans the gauge against an unstable surface, it may become difficult to read therefore making the job of the technician more difficult or add a layer of difficulty.

This device will enable the technician to mount the device on a structure in the field, hang the gauges for easy viewing and work with both hands on the equipment without risking damage to the gauges. The device will also allow the technician to store commonly used items in the device so that the technician can have a small part available and avoid the need to move from the work area to retrieve a small commonly used item.

NUMBERING REFERENCES

1 Device
5 Short Hollow Pipe
10 Cap
15 Long Hollow Pipe
20 Base
25 Magnet
30 Insert
35 Threads
40 Miscellaneous items

DETAILED DESCRIPTION OF THE EMBODIMENTS

Figure 1:
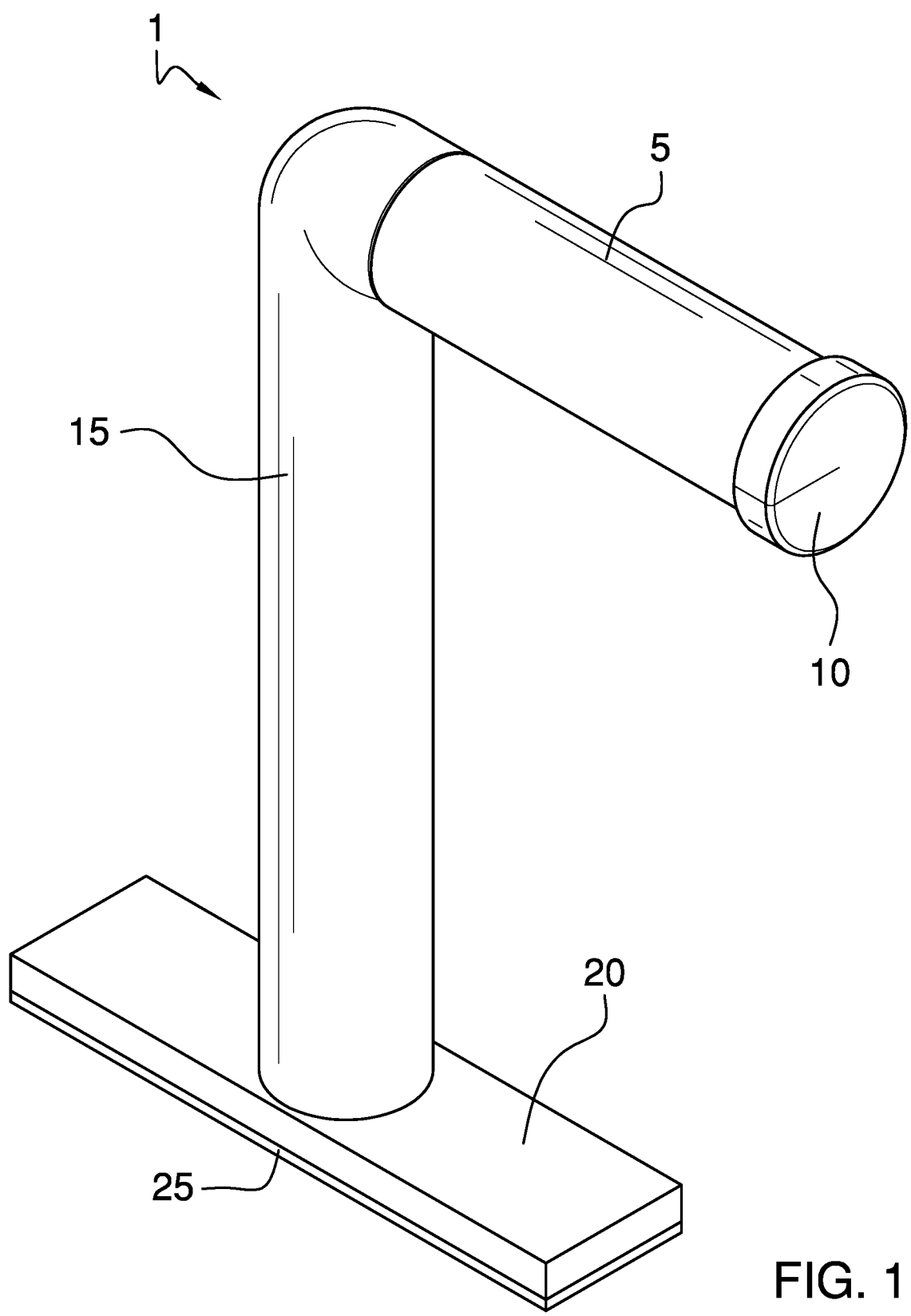
FIG. 1 is an isometric view of the device.

The device 1 is comprised of a base 20 which has a first side and a second side. On the underside of the first side a magnet 25 is placed so that this device can be mounted on a structure in the field. In FIG. 1 the base is depicted as a rectangle but the base may be a variety of different shapes including circular or a square to name a few. No specific shape is being claimed in this application.

The purpose of the base is to be able to provide a means to secure the device in the field and also mount a long hollow pipe 15, which ends in an elbow at the end furthest from the base 20.

At the elbow, which is threaded, a short hollow pipe 5 is mounted. A cap 10 is provided at the end of the short hollow pipe 5. The short hollow pipe 5 has internal threads (not depicted) which mate with the threads 35 on the elbow that are at the end of the long hollow pipe 15.

Figure 2:
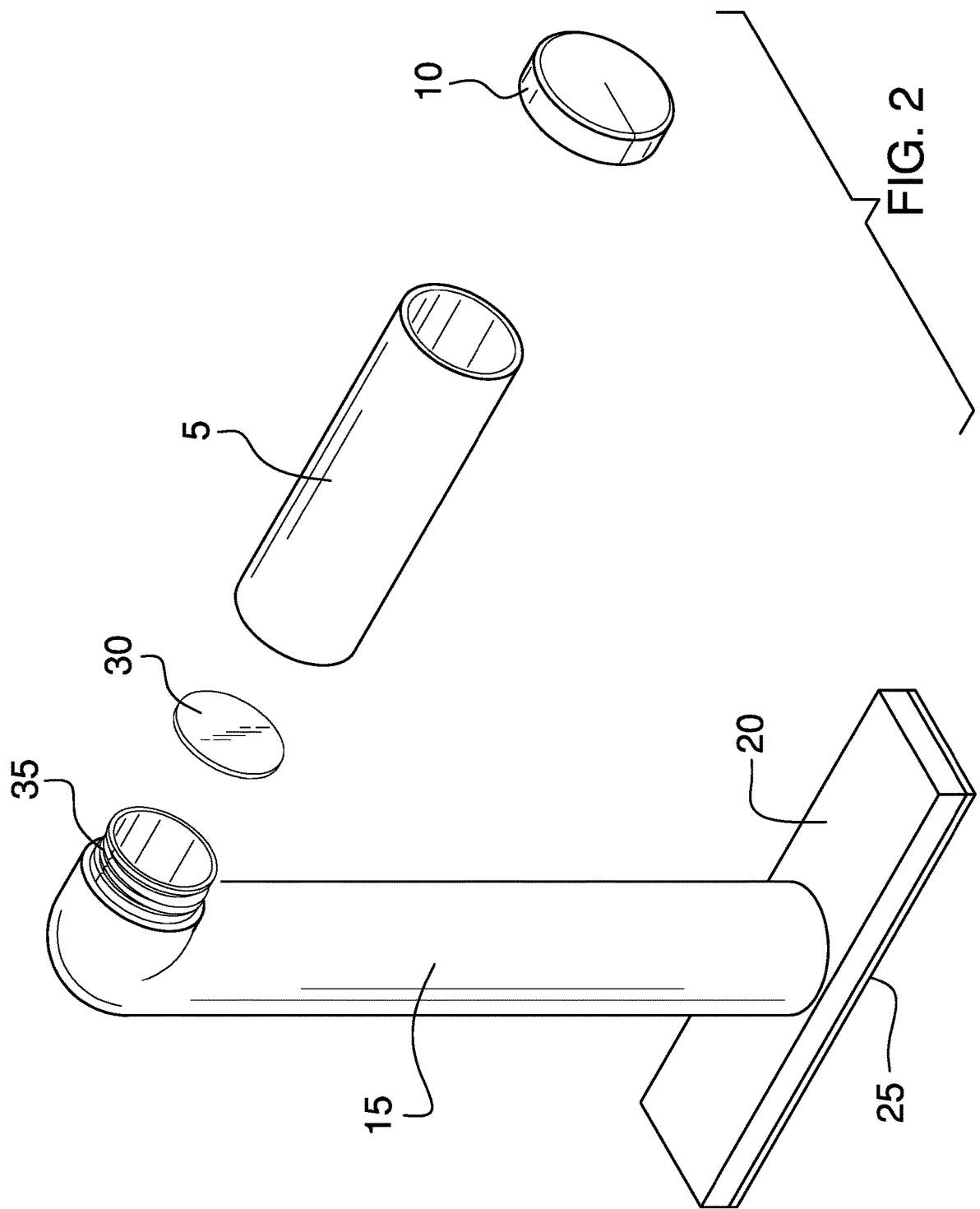
FIG. 2 is an explorer view of the device.
Figure 3:
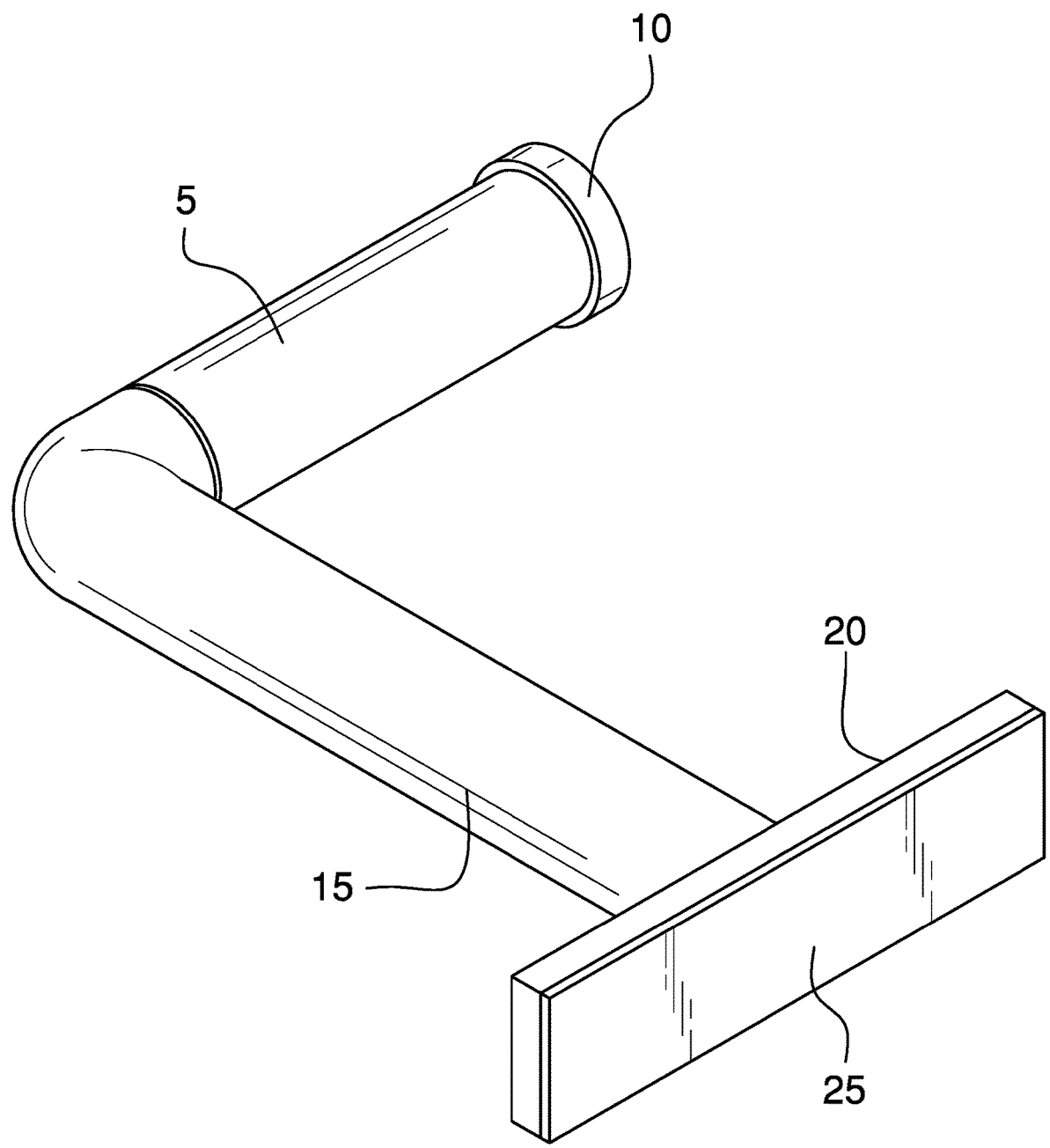
FIG. 3 is the bottom isometric view of the device.
Figure 4:
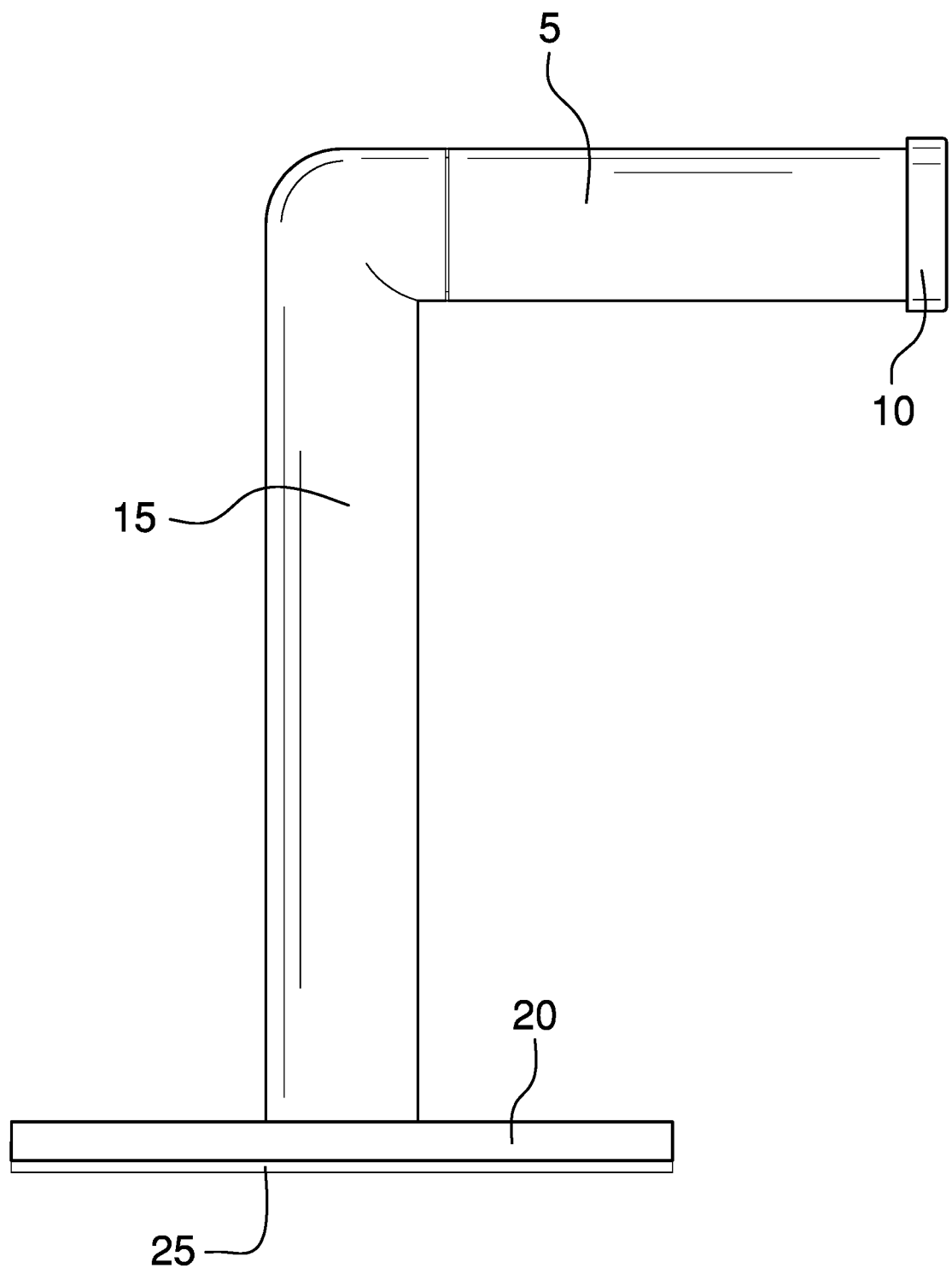
FIG. 4 is a side view of the device.
Figure 5:
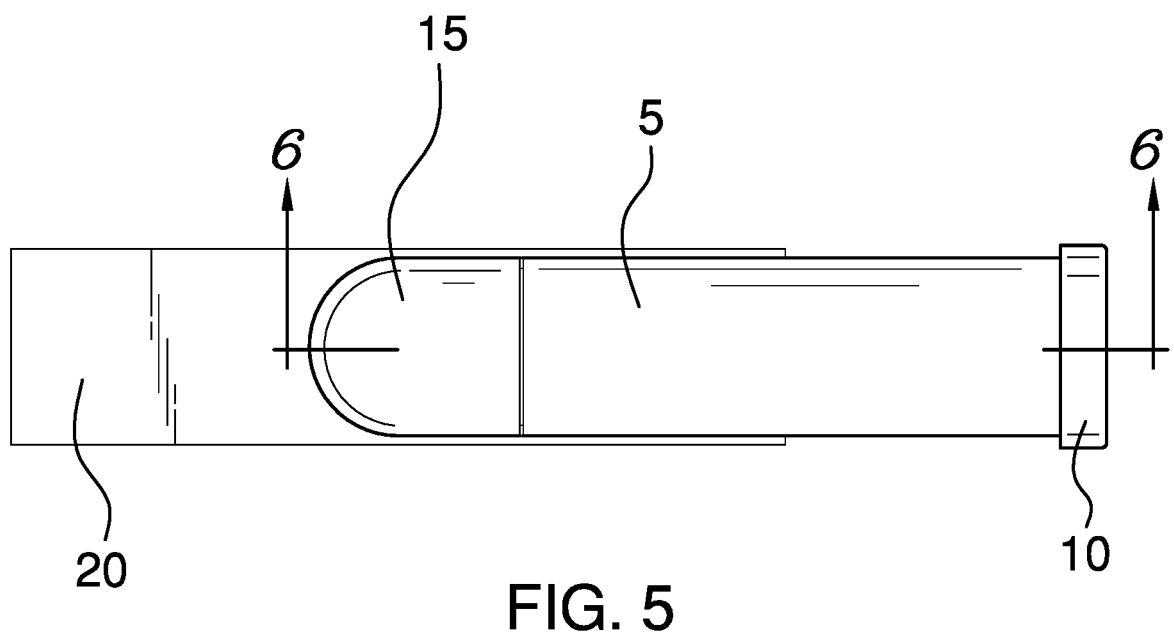
FIG. 5 is the top view of the device.
Figure 6:
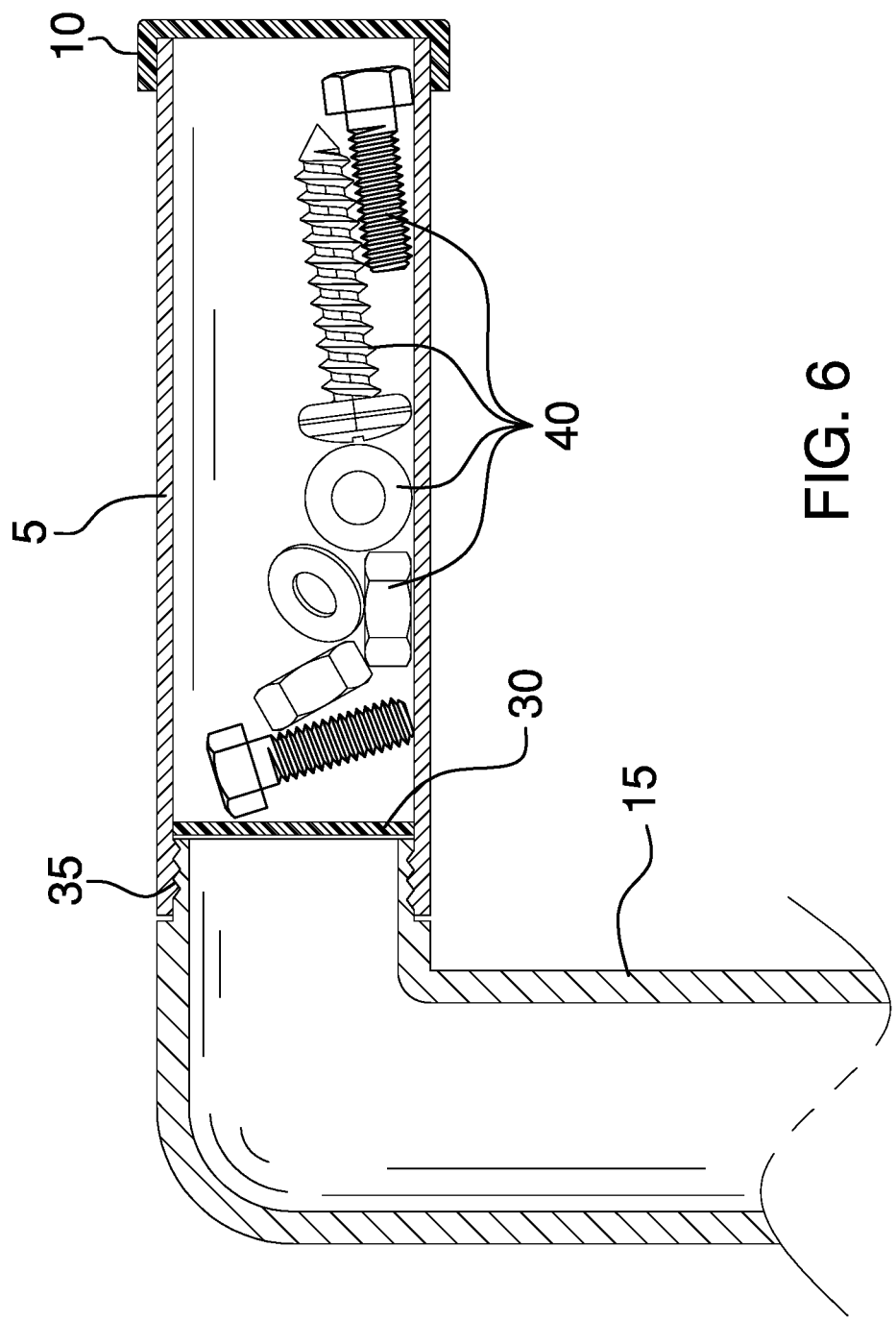
FIG. 6 is a cross-sectional view of the device.

An insert 30, is placed within the short hollow pipe 5 such as depicted in FIG. 2. The insert 30 prevents the miscellaneous items 40 such as depicted in FIG. 6 from spilling out of the short hollow pipe 5 when the hollow pipe is removed.

The purpose of the short hallow pipe is to store those commonly used items which are oftentimes needed in the field. The miscellaneous items 40 may consist of screws, nuts, washers and bolts. Other items may be used and the items that are depicted are representative examples. FIG. 6 is a cross-sectional view of the device, and shows the miscellaneous items 40 that are stored between the cap 10 and the insert 30.

While the invention has been described in the application, certain modifications may be made by those skilled in the art without departing from the essential features of this invention.

The inventor claims:
1. A gauge stand, which is compromised of
a base,
wherein the base has a certain predetermined shape;
a magnet,
wherein a magnet is placed on the underside of the base,
a long hollow pipe
wherein the long hollow pipe is a predetermined length,
wherein the long hollow pipe has a first end and a second end, wherein the first end of the long hollow pipe is secured to the base,
wherein the second end of the long hollow pipe ends in an elbow,
wherein the elbow has external threads,
a short hollow pipe,
wherein internal threads are provided on one end of the short hollow pipe,
wherein the short hollow pipe is a predetermined length,
wherein the short hollow pipe can be removed from the long hollow pipe,
a cap,
wherein a cap is provided on one end of the short hollow pipe,
an insert,
wherein the insert is placed within the short hollow pipe;
wherein the insert fits snugly within the short hollow pipe.

2. The gauge stand as described in claim 1 wherein the base is rectangular.

3. The gauge stand as described in claim 1 wherein the base is circular.

4. The gauge stand as described in claim 1 wherein the base is a square.

* * * * *